United States Patent [19]

Harley

[11] Patent Number: 5,080,322
[45] Date of Patent: Jan. 14, 1992

[54] TURNTABLE

[75] Inventor: David N. Harley, Dorset, England

[73] Assignee: Titus Tool Company Limited, Iver, England

[21] Appl. No.: 621,717

[22] Filed: Dec. 5, 1990

[30] Foreign Application Priority Data

Dec. 11, 1989 [GB] United Kingdom ................ 8927947

[51] Int. Cl.$^5$ .............................................. A47B 91/00
[52] U.S. Cl. ...................................... 248/349; 29/432; 29/527.1; 108/103; 248/678
[58] Field of Search ............... 248/349, 346, 144, 415, 248/678, 131; 108/103, 104, 94; 211/163; 29/432, 525, 437

[56] References Cited

U.S. PATENT DOCUMENTS

| | | | |
|---|---|---|---|
| 2,687,267 | 8/1954 | Copenhaver | 248/349 |
| 2,779,642 | 1/1957 | Matthews | 248/349 X |
| 3,652,972 | 3/1972 | Kreider | 248/349 X |
| 4,040,364 | 8/1977 | Morgan, Jr. | 108/104 X |
| 4,485,997 | 12/1984 | Potter | 211/163 X |
| 4,635,894 | 1/1987 | Sammons | 108/103 X |
| 4,659,050 | 4/1987 | Tabayashi | 248/349 |
| 4,697,778 | 10/1987 | Harashima | 248/349 |
| 4,738,422 | 4/1988 | Matheson et al. | 248/349 X |
| 4,825,527 | 5/1989 | Ladouceur | 29/432 |
| 4,939,827 | 7/1990 | Izuka | 29/525 |
| 4,946,127 | 8/1990 | Kulaga | 248/215 X |
| 5,000,513 | 3/1991 | Schmidt | 248/349 X |

Primary Examiner—Ramon O. Ramirez
Attorney, Agent, or Firm—Lowe, Price, LeBlanc & Becker

[57] ABSTRACT

A turntable element (10) is disclosed which comprises a substantially flat bearing holder (16) and a plurality of bearing members (22) which are rotatably engaged in respective apertures (24) extending inwardly towards the center of rotation of the turntable element (10) from the outer edge of the bearing holder (16). The bearing members (22) are rotatably engaged in their apertures (24) by cooperating retaining portions (28,30,34) on the bearing holder (16) and bearing members (22). A method of making such a turntable element (10) with the bearing holder (16) and bearing members (22) formed as an integral body is also disclosed. In the method the bearing members (22) are linked to the bearing holder (16) by frangible portions (36) which are broken by forcibly displacing the bearing members (22) to bring them into their rotatable engagement with the bearing holder (16).

17 Claims, 5 Drawing Sheets

TURNTABLE

This invention relates to a turntable and in particular to a turntable element which facilitates rotation of equipment, such as a television set, relative to the furniture on which it is supported and a method of making such a turntable.

Turntable units are known which typically comprise a lower plate or board as a base member and an upper plate or board as a rotatable support member which carries the equipment to be rotated. The two boards are generally pivotally connected via a shaft member, and to improve relative movement of the boards a turntable element including a number of bearings may be provided between them. The bearings may be in the form of ball-bearings or rollers and are typically mounted in a bearing plate or disc which is interposed between the two boards.

An example of such a turntable unit is shown and described in U.S. No. -A- 4 697 778. Such a turntable element is relatively expensive to produce because the bearings have to be manufactured as separate items and then individually located and fitted into their apertures in the bearing plate or disc.

One object of the present invention is to enable turntable elements, which include rotatable bearings, to be manufactured more economically.

According to the invention there is provided a method of making a turntable element which includes a substantially flat bearing holder with which ar rotatably engaged a plurality of bearing members, the method comprising forming the bearing holder and bearing members as an integral body including frangible portions linking the bearing members to the bearing holder, and forcibly displacing the bearing members so as to break the frangible portions and bring the bearing members into rotatable engagement with the bearing holder.

In such a method, only a single forming step is required for the bearing holder and all of the bearing members, rather than these components having to be made separately. Further, the bearing members do not have to be pre-located relative to the bearing holder for the purpose of assembly since they are inherently located in their correct positions by the frangible portions. A simple forced displacement of each bearing member is all that is required to complete the production of the turntable element with all its bearing elements rotatable in their proper positions.

According to another aspect of the invention there is provided a turntable element manufactured in accordance with the above method.

According to a further aspect of the invention there is provided a turntable element comprising a substantially flat bearing holder with which are rotatably engaged a plurality of bearing members, each bearing member being received in an aperture which extends from an outer edge of the bearing holder radially inwards relative to a centre of rotation of the turntable element, the bearing members being radially retained in their rotatably engaged positions by cooperating retaining portions on the bearing members and the bearing holder.

In order that the invention may be better understood an embodiment thereof will be described, by way of example, with reference to the accompanying drawings, in which.

Figure 1:
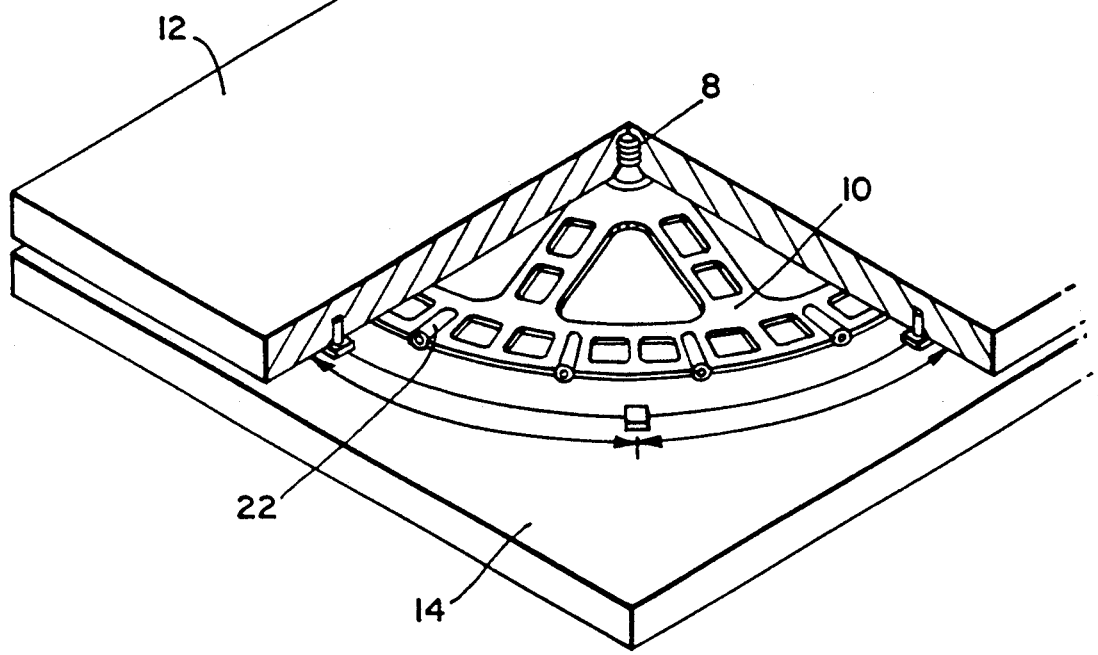
FIG. 1 is a cut-away perspective view showing a turntable element according to the invention when in use.
Figure 2:
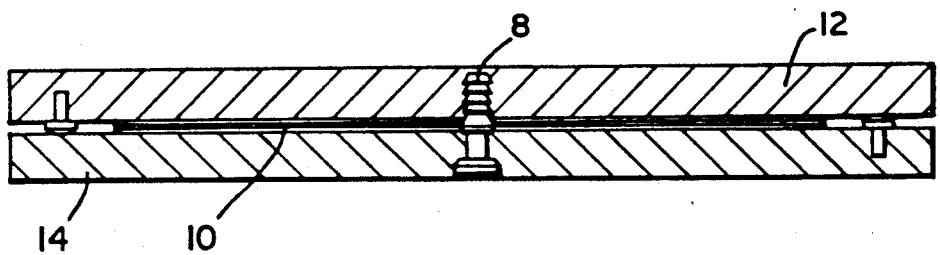
FIG. 2 is a sectional view of the turntable element of FIG. 1.
Figure 3:
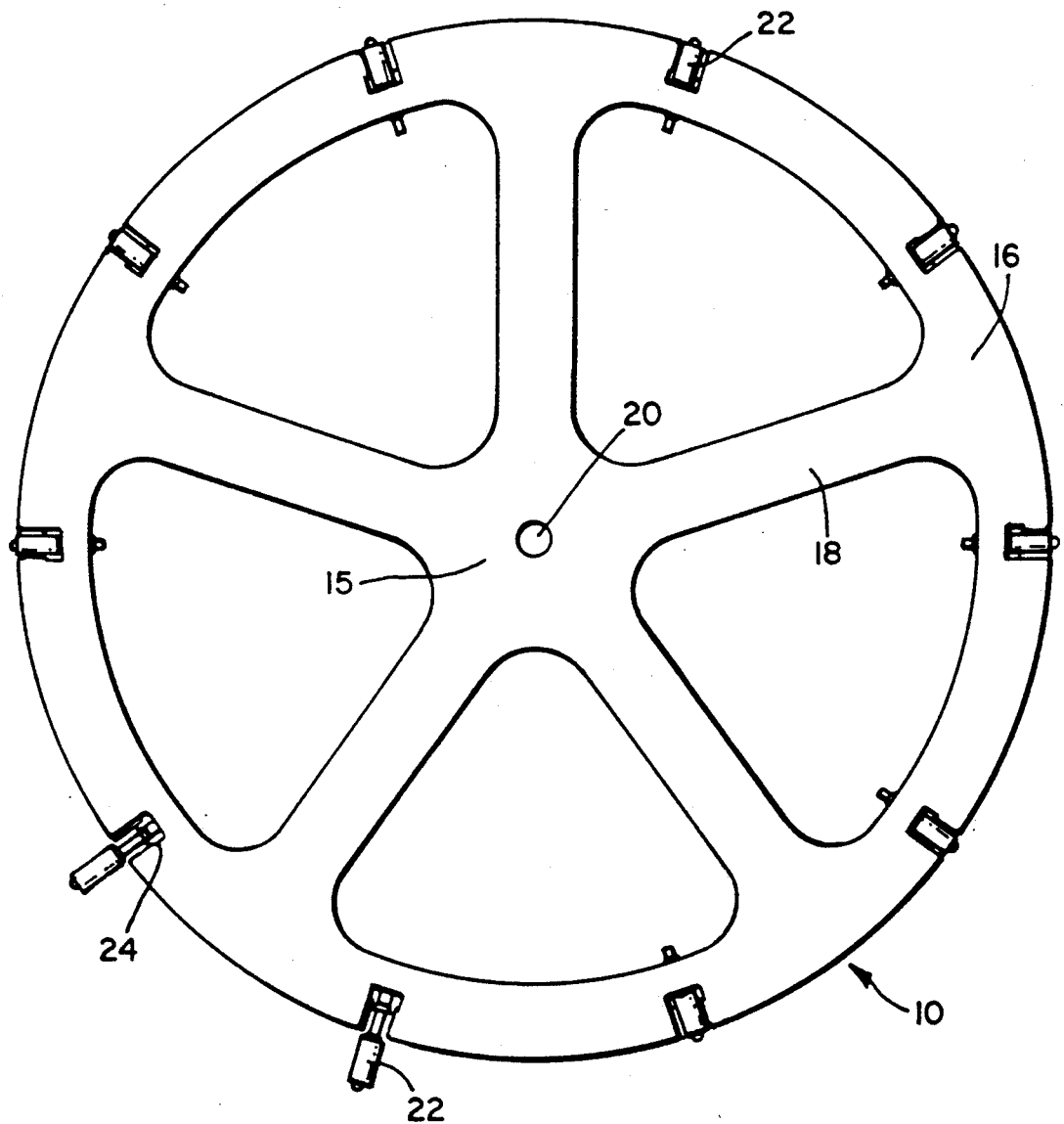
FIG. 3 is a plan view of a turntable element according to the invention during manufacture.

Referring firstly to FIGS. 1 and 2 a turntable element 10 according to the invention is shown positioned for use in association with an upper rotatable support board 12 and a lower base board 14. The turntable element 10 is interposed between the two boards as shown and a central shaft 8 passes through it, rotatably connecting the two boards so that they can move freely relative to one another.

The turntable element 10 comprises a generally diso-shaped bearing a holder, having a central disc 15 and an outer ring portion 16, connected by radial spokes 18. A central aperture 20 is provided to allow the shaft 8 to pass through the turntable element 10. In order to facilitate rotational movement of the two boards relative to one another the ring portion 16 of the bearing holder is provided with a number of circumferentially spaced cylindrical roller bearings 22 as will be described in more detail below.

The roller bearings 22 are received in apertures 24 in the ring portion 16 with their axes aligned radially relative to the centre of rotation of the turntable element 10. When the turntable element 10 is interposed between the upper and lower boards 12, 14 as shown in FIGS. 1 and 2, and a load is applied to the upper support board 12, such as a television set placed thereon, the load is evenly distributed over all of the roller bearings 22. The rollers will rotate, describing a circular path on the boards when the load is turned, thus allowing the upper support board 12 to rotate whilst the lower base board 14 remains stationary.

Figure 4:
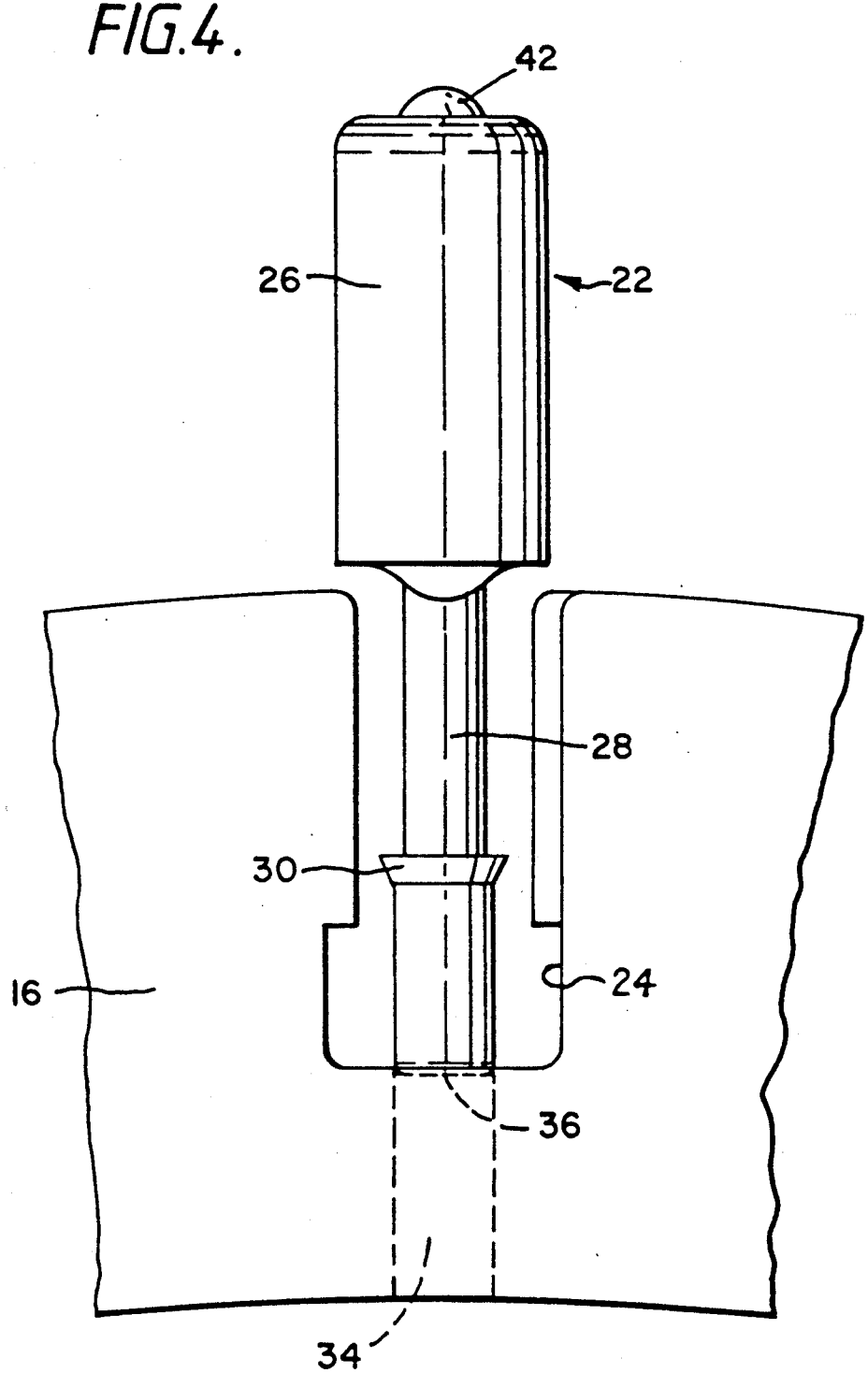
FIG. 4 shows a detail of a roller bearing of a turntable element according to the invention during manufacture.
Figure 5:
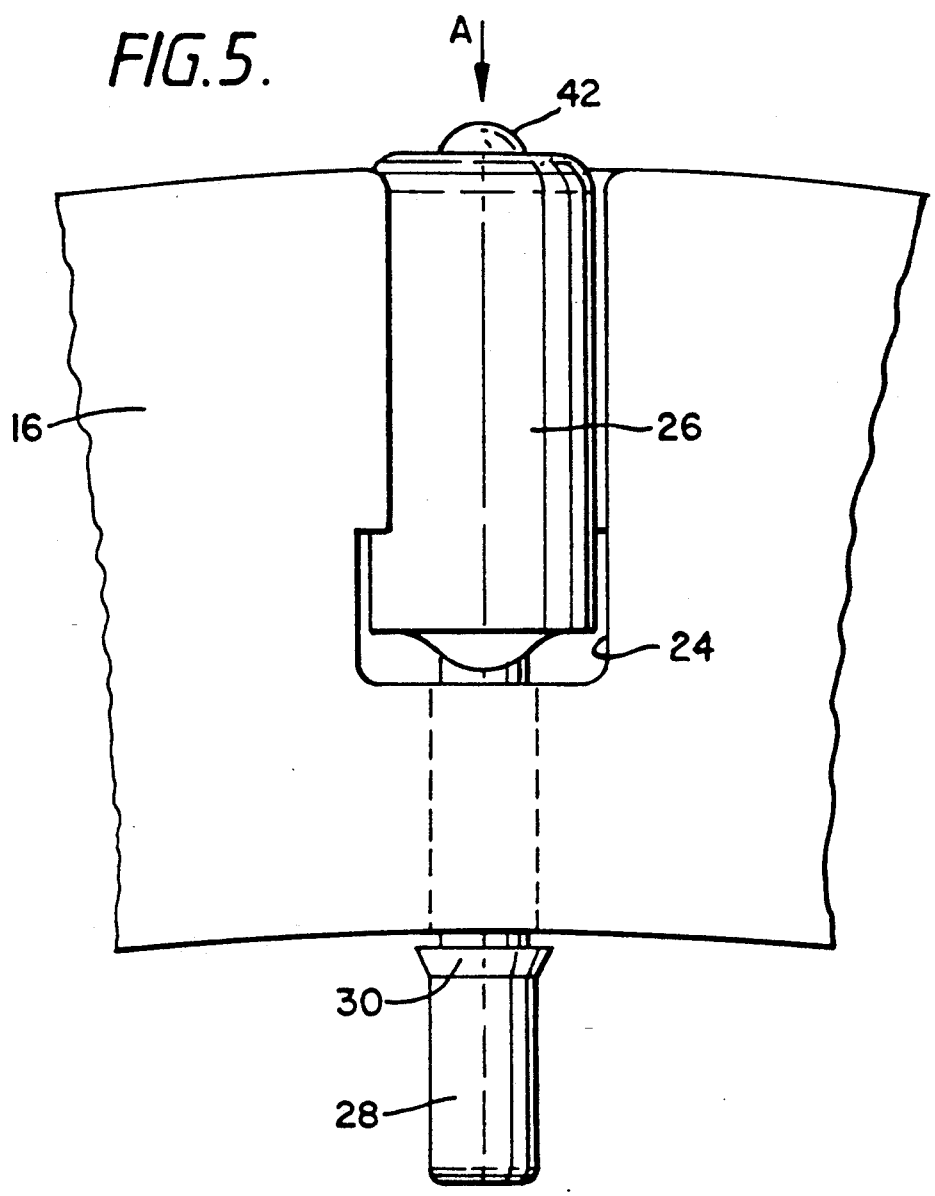
FIG. 5 shows a detail of the roller bearing of FIG. 4 when the turntable element is ready for use.
Figure 6:
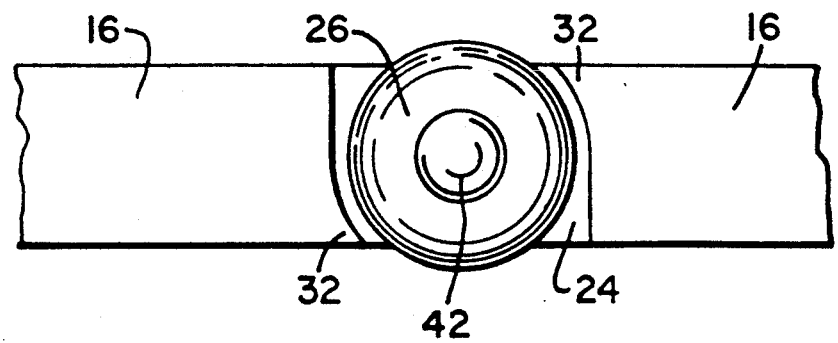
FIG. 6 is a view in the direction A shown in FIG. 5.

Referring now to FIGS. 4, 5 and 6 the manufacture and construction of the turntable element 10, and in particular the roller bearings 22, will be described in more detail. As can be seen each roller bearing 22 essentially comprises two portions; the roller 26 and a coaxial shaft portion 28. The shaft portion 28 is provided with a retaining member 30 in the form of a skirt axially spaced from its end, the function of which will be described below. The end faces of the rollers 26 each have a domed protrusion 42, the purpose of which will be described later.

The turntable element 10 is formed from an injection plastics material and the whole item, including the roller bearings 22, is integrally formed in a single moulding process. FIG. 4 shows a detail of one of the rollers in its initial state immediately after moulding. Each aperture 24 is formed with its axis aligned along a radius of the turntable element 10, is open at the outer edge of the ring portion 16, and extends in depth across a substantial part of the width of the ring portion 16. The aperture includes a slot in the top and bottom surfaces of the ring portion 16. The depth of the aperture 24 corresponds to the width of the roller 26.

The cross-section of the aperture 24 can be seen in FIG. 6. On the top surface of the turntable element 10 one edge of the aperture slot is undercut forming a slight projection 32. On the lower surface the diagonally opposed edge is undercut forming a complementary projection. These projections 32 act as guides for the roller bearings 22 but are not adequate to retain the rollers 26 in the apertures 24 without the additional action of the retaining member 30 on the shaft portion 28, to be described below.

From the base of the aperture 24, that is the end closest to the center of the turntable element 10, to the inner edge of the ring portion 16 a housing in the form of a cylindrical bore 34 is provided which is open at its inner end. The bore 34 is formed coaxially with the shaft portion 28 of the roller bearing 22, the inner end of the shaft portion 28 being level with the base of the aperture 24 and connected thereto by a frangible web 36. When the turntable element 10 has been moulded each roller bearing 22 can be driven into position with its shaft portion 28 in the bore 34 by applying a force to the end face of the roller portion 26, the force being directed radially with respect to the turntable element 10. This action will break the frangible web 36 connecting the roller bearing shaft portion 28 to the base of the aperture 24 and drive the roller bearing 22 into its housing. The flexibility of the plastics material used in the manufacture of the turntable element 10 allows the wider diameter retaining member 30 of the shaft portion 28 to be forced through the bore 34 where it engages with the inner side of the ring portion 16, the engagement rotatably retaining the roller bearing 22 in the aperture 24. The retaining member 30 is so positioned on the shaft portion 28, and the length of the shaft portion 28 so chosen, that when it locates on the inner side of the ring portion 16, the roller 26 is located in the aperture 24. The roller 26 and the shaft portion 28 are then free to rotate in the aperture 24 and the bore 34, respectively.

The diameter of the rollers 26 is chosen to be slightly greater than the thickness of the bearing holder 10 so that they protrude sufficiently from the slots of their respective apertures 24 to provide surfaces for rolling contact with the boards 12, 14.

Figure 7A:
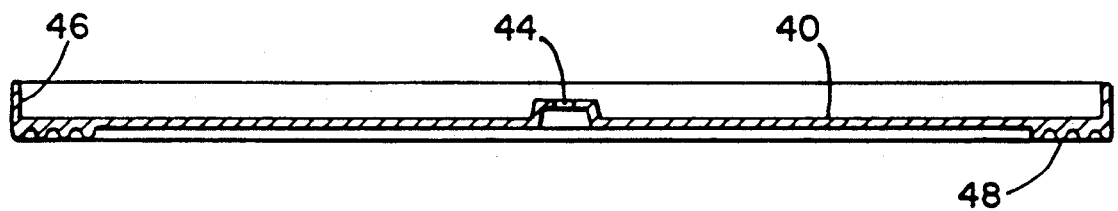
FIG. 7(a) shows a tray which may be attached to the turntable element according to a preferred embodiment of the invention.
Figure 7B:
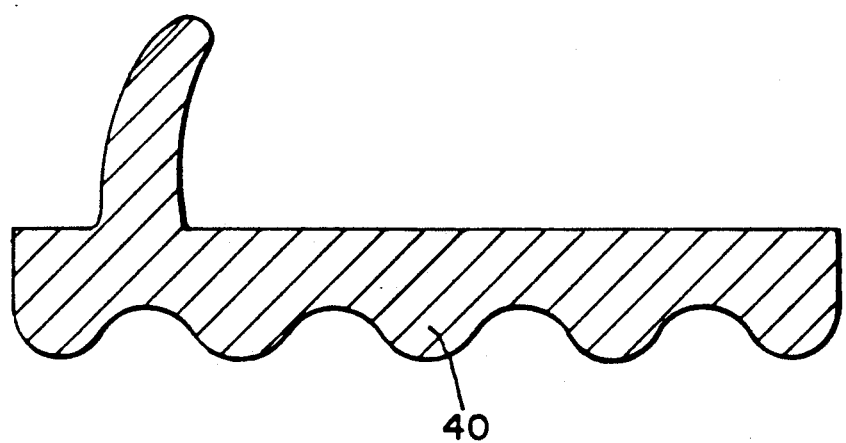
FIG. 7(b) shows a detail of another tray which may be attached to the turntable element according to a preferred embodiment of the invention.

As so far described, the turntable element 10 has been used interposed between two boards 12, 14 rotatably fixed together by a central shaft member 8. If it is intended that the turntable be used on an article of furniture it is advantageous to dispense with the lower board 14 and fix the turntable element 10 and upper support board 12 directly to the top surface of the article of furniture in question. However, this would require the drilling of a hole in the furniture which is clearly undesirable. In a preferred embodiment of the invention the turntable element 10, as already described, is provided with a tray 40 in place of the lower board member 14. This tray 40 provides the lower surface on which the roller bearings 22 move. The tray may be disc-shaped with an outer ring, radial spokes and a central aperture 44, similar in shape to the turntable element 10. Attachment to the turntable element 10 can be by way of a central shaft or pin which also passes into the upper board 12, rotatably connecting the tray 40 and the upper board 12. An example of such a tray element is shown in FIG. 7(a). As can be seen, the tray has a raised circumferential edge 46 to contain the turntable element 10, and a ribbed surface 48 which acts as a grip to keep the tray in position on the surface on which it is placed. Alternatively, the tray element 40 may be in the form of a simple ring of the same size as the ring portion 16 of the turntable element 10, also having a raised outer circumferential edge as seen in FIG. 7(b). This edge is undercut as shown so that it provides a snap-fit engagement with the turntable element 10 by locating over the small domed protrusions 42 on the ends of the rollers 26.

Stop members may be incorporated in the turntable arrangement to limit the angle through which it can be rotated. Examples of such stop members can be seen in FIG. 1. These are placed in the two boards at angularly separated positions but at the same radial distance from the axis of rotation so that they will butt up against each other at a certain relative position of the moving and stationary parts of the turntable, and prevent rotation beyond that position.

I claim:

1. A method of making a turntable element which includes a substantially flat bearing holder with which are rotatably engaged a plurality of bearing members, the method comprising forming the bearing holder and bearing members as an integral body including frangible portions linking the bearing members to the bearing holder, and forcibly displacing the bearing members so as to break the frangible portions and bring the bearing members into rotatable engagement with the bearing holder.

2. A method as claimed in claim 1 wherein each bearing member has a bearing portion and a shaft portion, the shaft portions being rotatably engageable in respective housings in the bearing holder, the forcible displacement comprising driving the shaft portions into their respective housings.

3. A method as claimed in claim 2 wherein the integral body is formed such that the housings are in axial alignment with the shaft portions and the shaft portions, are driven axially into the housing.

4. A method as claimed in claim 1 wherein the bearing holder and each bearing member are formed with retaining portions which are brought into co-operating relationship by said forcible displacement so as to retain the bearing members in their rotatably engaged positions.

5. A method as claimed in claim 1 wherein the retaining portions on the bearing members are radial protrusions on their shaft portions, which are brought into engagement behind retaining portions of the respective housings by said forcible displacement.

6. A turntable element comprising a substantially flat bearing holder with which are rotatably engaged a plurality of bearing members, each bearing member being received in an aperture which is open at an outer edge of the bearing holder and extends therefrom radially inwards relative to a centre of rotation of the turntable element, the bearing members being retained against radially outward movement from their rotatably engaged positions by cooperating retaining portions on the bearing member and the bearing holder, which retaining portions are located radially inwardly of the apertures.

7. A turntable element as claimed in claim 6 wherein the bearing holder comprises a central disc portion and an outer ring portion connected by a plurality of radial spokes, the bearing members being rotatably engaged with the outer ring portion of the bearing holder.

8. A turntable element as claimed in claim 6 in combination with a support board member superposed on the turntable element and located relative thereto by a central pivot.

9. A turntable element as claimed in claim 6 in combination with, and superposed on, a base member on which the bearing members can move.

10. A turntable element as claimed in claim 9 wherein said base member is a tray.

11. A turntable element as claimed in claim 10 wherein the tray is located relative to the bearing holder by a central pivot.

12. A turntable element as claimed in claim 10 wherein the tray has a raised outer edge and the turntable element is provided with protrusions on its periphery, the edge of the tray being adapted to locate over the protrusions in snap-fit engagement.

13. A turntable element as claimed in claim 10 wherein the tray is provided on its underside with gripping ribs.

14. A turntable element as claimed in claim 6 wherein each bearing member comprises a bearing portion and a shaft portion, the shaft portions being rotatably engaged in respective housings in the apertures.

15. A turntable element comprising a substantially flat bearing holder formed as an integral body with a plurality of bearing members, the bearing members being linked to the bearing holder by tangible portions which are broken by forcible displacement of the bearing members to bring said bearing members into rotatable engagement with the bearing holder.

16. A turntable element as claimed in claim 15 wherein each bearing member comprises a bearing portion and a shaft portion, the shaft portions being rotatably engaged in respective housings in apertures in said bearing holder.

17. A turntable element as claimed in claim 16, wherein retaining portions on the bearing members are radial protrusions on their shaft portions which engage behind retaining portions of the respective housings to retain said bearing members.

* * * * *